(12) United States Patent
Ramtahal et al.

(10) Patent No.: US 11,742,722 B2
(45) Date of Patent: Aug. 29, 2023

(54) COOLING OF ELECTRICAL MACHINES

(71) Applicant: General Electric Renovables España, S.L., Barcelona (ES)

(72) Inventors: Sadeo Ramtahal, Schenectady, NY (US); Andrew Thomas Cross, Niskayuna, NY (US); Rinaldo Luigi Miorini, Niskayuna, NY (US); Julio Cesar Urresty, Barcelona (ES); Cesar Muñiz Casais, Barcelona (ES); Lakshminarayana Kanakamedala, Schenectady, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 83 days.

(21) Appl. No.: 17/376,666

(22) Filed: Jul. 15, 2021

(65) Prior Publication Data

US 2022/0021276 A1    Jan. 20, 2022

(30) Foreign Application Priority Data

Jul. 16, 2020    (EP) .................................... 20382644

(51) Int. Cl.
*H02K 9/22*    (2006.01)
*H02K 9/02*    (2006.01)
*F03D 9/25*    (2016.01)

(52) U.S. Cl.
CPC .............. *H02K 9/227* (2021.01); *H02K 9/02* (2013.01); *F03D 9/25* (2016.05); *F05B 2220/706* (2013.01); *F05B 2260/2241* (2013.01)

(58) Field of Classification Search
CPC .. H02K 9/227; H02K 9/02; F03D 9/25; F05B 2220/706; F05B 2260/2241
See application file for complete search history.

(56) References Cited

U.S. PATENT DOCUMENTS

| 876,568 | A  | * | 7/1908 | Lord |  |
|---|---|---|---|---|---|
| 8,952,582 | B2 | * | 2/2015 | Jean | .......................... H02K 9/02 |
| 2016/0149472 | A1 | * | 5/2016 | Pal | .......................... H02K 9/227 |
| 2017/0257054 | A1 | * | 7/2017 | Tsumasaka | ............ H02K 11/21 |
| 2019/0273423 | A1 | * | 9/2019 | Saint-Michel | ........... H02K 1/14 |

(Continued)

FOREIGN PATENT DOCUMENTS

| DE | 596337 C | 4/1934 |
|---|---|---|
| DE | 102016103408 A1 | 9/2016 |
| EP | 2887511 A1 | 6/2015 |

(Continued)

OTHER PUBLICATIONS

WO-2012107684-A1_translate (Year: 2012).*
European Search Report Corresponding to EP20382644 dated Dec. 14, 2020.

*Primary Examiner* — Tulsidas C Patel
*Assistant Examiner* — Mohammed Ahmed Qureshi
(74) *Attorney, Agent, or Firm* — Dority & Manning, P.A.

(57) ABSTRACT

An electrical machine comprising a rotor 20, a stator 30 and an air gap 40 arranged between the rotor 20 and the stator 30 is provided. The stator 30 or rotor 20 comprises a plurality of electrical coils 90, wherein one or more of the electrical coils 90 carry a heat sink, wherein the heat sink is attached to the electrical coil with a thermally conductive material. Methods for modifying a temperature distribution of a stator in an electrical machine are also provided.

14 Claims, 4 Drawing Sheets

(56) References Cited

U.S. PATENT DOCUMENTS

2020/0021163 A1    1/2020    Lhotellier et al.

FOREIGN PATENT DOCUMENTS

| EP | 3024127 A2 | 5/2016 | |
|---|---|---|---|
| EP | 3534500 A1 | 9/2019 | |
| FR | 2971376 A1 | 8/2012 | |
| JP | H04183258 A | 6/1992 | |
| JP | 2008220003 A | 9/2008 | |
| WO | WO-2012107684 A1 * | 8/2012 | ............ B60L 3/0061 |

* cited by examiner

COOLING OF ELECTRICAL MACHINES

The present disclosure relates to electrical machines and more particularly relates to devices, systems and methods for cooling electrical machines. The present disclosure also relates to wind turbines comprising such electrical machines, and in particular to wind turbines comprising permanent magnet generators with cooling arrangements.

BACKGROUND

Electrical machines, such as motors and generators, generally comprise a rotor structure and a stator structure. Large electrical generators may be permanent magnet excited generators (PMG) or electrically excited synchronous generators (EESG).

Such generators may be used for example in wind turbines. Wind turbines generally comprise a rotor with a rotor hub and a plurality of blades. The rotor is set into rotation under the influence of the wind on the blades. The rotation of the rotor shaft either directly drives the generator rotor ("directly driven") or through the use of a gearbox. Such a direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, permanent magnet generators or electrically excited synchronous generators may also be coupled to a gearbox which increases the rotational speed of the generator to for example between 50 to 500 rpm or even more.

Electrical machines comprise a rotor which rotates with respect the stator. The rotor may be the inner structure and the stator the outer structure. The stator in this case thus surrounds the rotor. Alternatively, the configuration may be opposite to this, i.e. the rotor surrounds the stator.

In case of permanent magnet excited generators (PMG), permanent magnets (PM) are generally comprised in the rotor (although they could also be arranged alternatively in the stator structure), whereas winding elements (e.g. coils) are usually included in the stator (although they could alternatively be arranged in the rotor structure). Permanent magnet generators are generally deemed to be reliable and require less maintenance than other generator typologies.

Multiple permanent magnets may be provided in permanent magnet modules, which may be attached to the rotor as a single item. A permanent magnet module may be defined as a unit having a plurality of permanent magnets, such that the plurality of magnets can be mounted and unmounted together. Such a module may have a module base with a shape suitable for housing or carrying a plurality of permanent magnets that may be fixed to the base. The base may be configured to be fixed to a rotor rim in such a way that the plurality of magnets are fixed together to the rotor rim through the module base. The use of permanent magnet modules may facilitate the manufacturing of a rotor.

Electrically excited synchronous generators generally comprise a rotor having a plurality of pole shoes and excitation coils. In use, a current is applied to the excitation coils which create the polarity of the poles. Adjacent poles have a different magnetic polarity. As the rotor turns, the magnetic field from the pole shoes is applied to the windings of the stator causing a variable magnetic flux in the stator windings which produces a voltage in the stator windings. In electrically excited synchronous generators the magnetic field to generate the electrical power is created electrically. As a result, such generators do not require the use of permanent magnet containing rare earth elements.

Cooling is generally important in electrical machines, since the active elements (magnets or coils) heat up in use. A too high temperature can lead to failure of these elements and to less efficient operation.

Different configurations for electrical machines are known e.g. radial machines and axial machines. In axial machines, rotor and stator axially face each other. The air gap is axially arranged in between rotor and stator. In radial machines, a substantially annular air gap may be formed between rotor and stator. And one of the rotor and stator is arranged to radially surround the other. Due to the motion of the rotor, the air in the air gap is moved around. The air hereby provides a cooling effect.

It is known to provide an active air cooling or air conditioning system which provides a cold air flow through an inner stator structure. The cooling air flow is then distributed along the circumference of the stator. The air flow then axially crosses the air gap from one side to the other, thereby cooling the active elements of the rotor and stator. The hot air is then collected at the opposite axial side. The hot air may then be exhausted or cooled in a heat exchanger and be used again.

With cooling air crossing the air gap axially from one side to the other, the air heats up as it passes through the air gap. The cooling air is thus cooler on one side than on the opposite side, and thus provides more effective cooling on one side than on the other. The result is that cooling of the active elements is not homogeneous, i.e. one side of a coil of an electrical machine may constantly have a higher temperature than another side of the same coil. This effect is of course not limited to a single coil only, or even to coils only. Rather this effect may be seen in general for active elements arranged along the air gap.

An inhomogeneous temperature distribution affects the operation of the electrical machine. The maximum temperature of the electrical machine is generally required to stay below a specific threshold. In order to comply with this requirement of a maximum temperature, it may be necessary to increase the cooling air flow, or it may put a restraint on the maximum electrical power of the electrical machine. If the temperature distribution can be made more homogeneous, for a given electrical machine, the requirements of the air cooling system may be lower, or the nominal power could be increased.

The size and type of electrical machines and the potential problems described herein are not limited to generators in direct drive applications, and not even to the field of wind turbines only. Electrical machines of considerable dimensions that may suffer from the same problems and/or have the same complications may also be found e.g. in steam turbines and water turbines.

The present disclosure provides examples of systems and methods that at least partially resolve some of the aforementioned disadvantages.

SUMMARY

In a first aspect, an electrical machine is provided comprising a rotor, a stator and an air gap arranged between the rotor and the stator. The stator and/or rotor comprises a plurality of electrical coils, wherein one or more of the electrical coils carry a heat sink to dissipate heat from the electrical coil to the air gap. The heat sink is attached to the electrical coil with a thermally conductive material.

In accordance with this aspect, cooling of electrical coils can be affected and tailored. A heat sink may be attached to a surface of the coil and thereby a flow of air around the coil may be affected. Since the electrical coils are typically made from a thermally highly conductive material such as copper, this can affect the temperature distribution of the coil not only where the heat sink is attached, but along the whole length of a coil.

In examples, this can make the temperature distribution more homogeneous throughout a coil. By avoiding hot spots, efficiency of the electrical machine may be improved.

A heat sink as used throughout the present disclosure may be understood as any structure acting as a passive heat exchanger transferring heat from the electrical coil to air in the air gap.

In a further aspect, a method for modifying a temperature distribution of a stator in an electrical machine is provided. The method comprises operating the electrical machine and measuring a temperature distribution of the stator when operating. The method further comprises attaching a heat sink to a selected are of the surface of one or more electrical coils of the stator to increase a contact surface with an air flow around the electrical coils.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
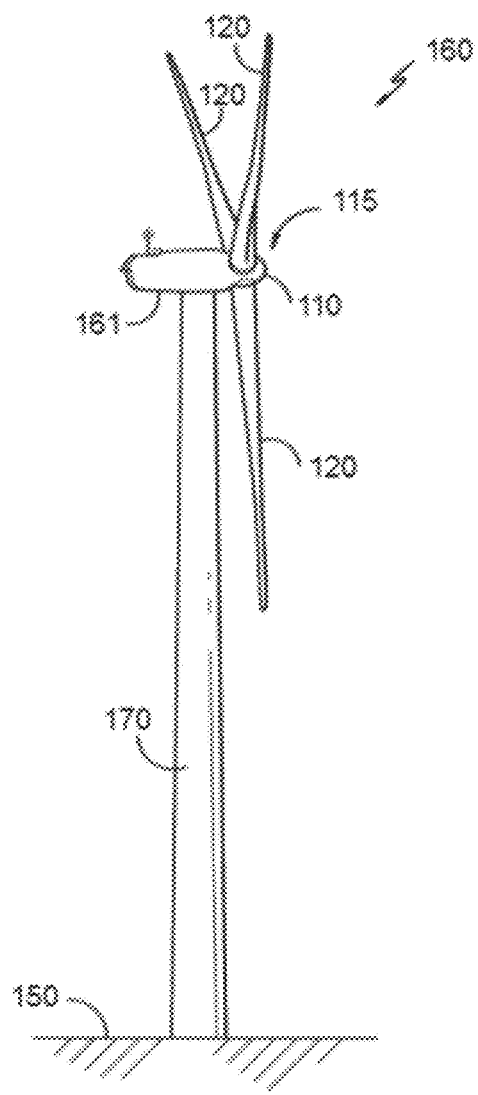
FIG. 1 illustrates a perspective view of a wind turbine according to one example.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
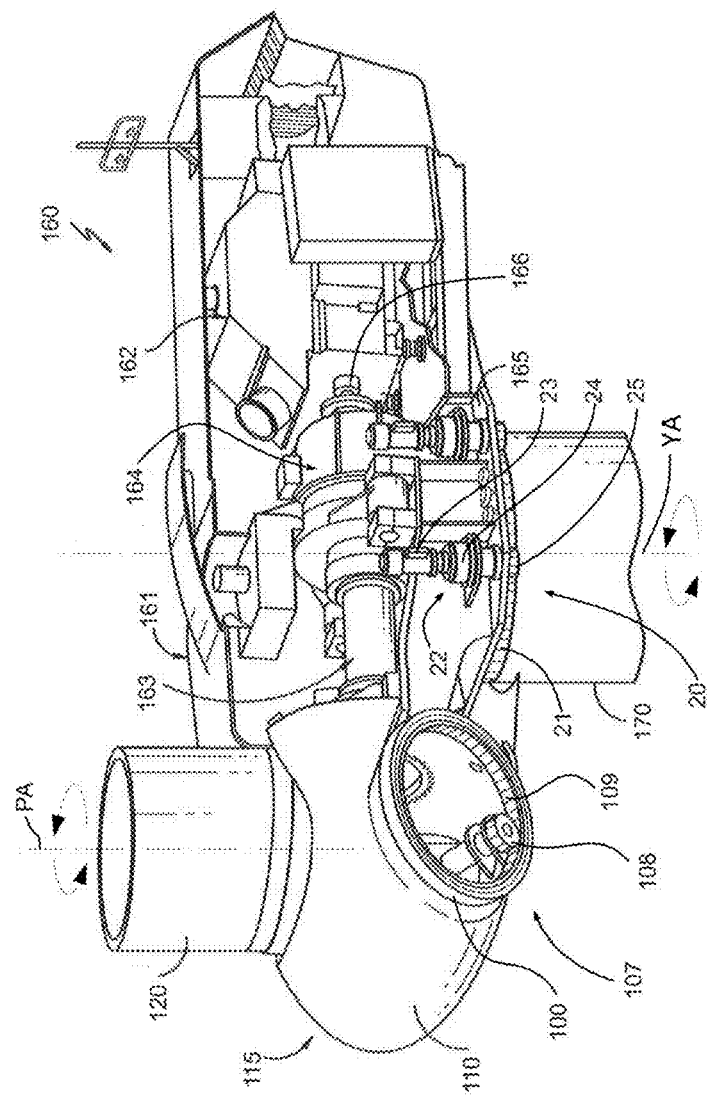
FIG. 2 illustrates a detailed, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

The energy produced by the generator may be delivered to a converter which adapts the output electrical power of the generator to the requirements of the power grid. The electrical machine may comprise electrical phases, e.g. three electrical phases. The converter may be arranged inside the nacelle or inside the tower or externally.

Figure 3:
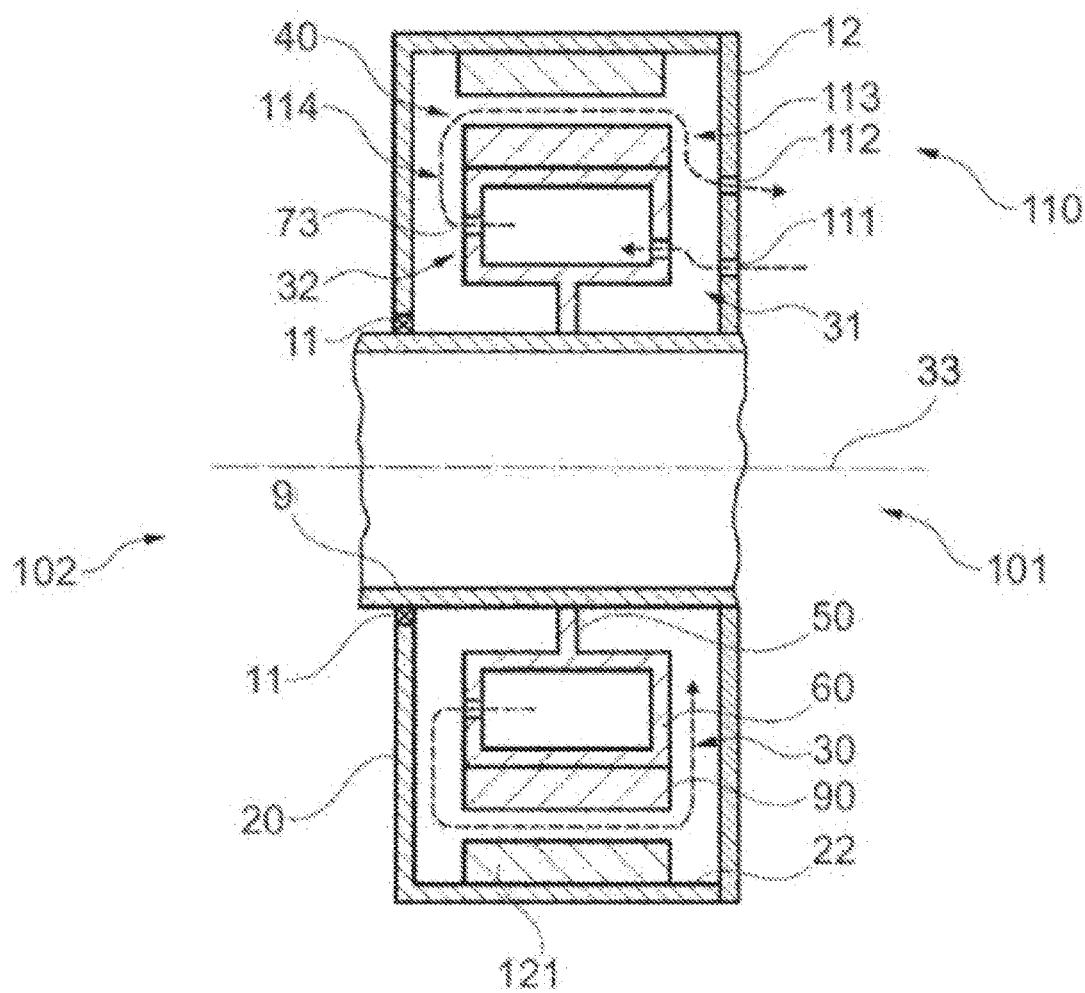
FIG. 3 schematically represents a cross-sectional view of an example of an electrical machine.

FIG. 3 schematically illustrates an electrical generator, specifically a direct drive wind turbine generator.

The electrical generator 10 of FIG. 3 comprises a rotor 20 extending from a first side 101 to a second side 102 and configured to rotate about a rotational axis 33, a stator 30, an air gap 40 between the rotor 20 and the stator 30.

The stator 30 of this figure comprises a plurality of electrical coils 90 and a stator structure 50 comprising a circumferential support 60 supporting the plurality of electrical coils 90. The stator structure 50 extends from a first side 31 to a second side 32 along the rotational axis 33 of the electrical generator.

The electrical generator 10 of FIG. 3 further comprises an air-cooling system 110 to cool the plurality of electrical coils 90. In this example, the air-cooling system 110 comprises an electrical machine air inlet 111, an air distribution channel 72 extending through a portion of the circumferential support 60 and an electrical machine air outlet 112 in fluid communication with the air gap 40. The electrical machine air inlet may allow an air flow to enter into the electrical machine.

Cooling air delivered by the air cooling system 110 may provide cold air to air gap 40. This air can thereby cool the electromagnetic elements arranged along the air gap, e.g.

magnets or coils arranged with the rotor and the electrical coils 90 arranged on the stator.

The air distribution channel 72 of this example comprises an air entrance 71 in fluid communication with the electrical machine air inlet 111 and being arranged at the first side 31 of the circumferential support 60 and. The air distribution channel further comprises a plurality of axial air openings 73 arranged at the second side 32 of the circumferential support 60 in fluid communication with the air gap 40 to distribute an air flow from the electrical machine air inlet 111 along the air gap 40.

In the electrical generator 10 of this figure, the rotor 20 surrounds the stator 30. The rotor is rotatably mounted on a supporting frame 9 of a wind turbine through a generator bearing 11. The rotor 20 may be connected to a rotor hub of a wind turbine (not shown in this figure) which causes it to rotate. The stator 30 may be rigidly connected to a supporting frame 9 of a wind turbine. The electrical windings 90 are arranged on an outer side of an external rim of the circumferential support and magnet modules 121 may be arranged on an inner side of an external rotor rim 22.

In the example of this figure, the electrical generator comprises cover plate 12 arranged at the first side 101. The cover plate 12 may close the electrical generator and may be fixedly attached to supporting frame 9 of a wind turbine. A sealing member may be arranged between a portion of the rotor rim 22 close to the first side 101 and the cover plate 12.

In other examples, the cover plate 12 may form part of the rotor 20. In some of these examples, an additional generator bearing may rotatably connect the cover plate with the supporting frame of a wind turbine.

Cold air flow may enter into the electrical generator 10 through the electrical machine air inlet 111. This cold air flow may be guided through the stator structure 50 and the plurality of axial air openings 73 towards the air gap 40 of the electrical generator 10. The air flow may thus be substantially uniformly distributed along the circumference of the air gap 40. This cold air flow may thus cool down the electromagnetic components of the rotor and of the stator arranged at the air gap 40. The air flow may axially pass through the air gap from the second side 102 to the first side 101 to cool down the electromagnetic components arranged at the air gap. Heat from the electromagnetic components is transferred to the air flow and the temperature of the air flow at the first side 101 may be higher than at the second side 102. This hot air flow may then exit the electrical generator through the electrical machine air outlet 112 to be cooled down in a heat exchanger. The electrical machine air outlet may allow an air flow to exit the electrical machine.

The electromagnetic components, e.g. electrical coils, arranged at the air gap may thus operate at a temperature within a predetermined range and the electrical machine may thus efficiently operate. As the stator structure is used to distribute the air flow along the circumference of the stator, a smaller number of air entrances may be required. Accordingly, integration constraints of mounting an electrical generator in for example a direct drive wind turbine may be minimized.

The air-cooling system according to this figure, comprises a second side radial air channel 114 radially extending between the second side 32 of the circumferential support 60 and the second side 102 of the rotor 20. The second side radial air channel 114 may communicate the plurality of axial air openings 73 with the air gap 40.

The air-cooling may comprise a first side radial air channel 113 radially extending between the first side 31 of the circumferential support 60 and the first side 101 of the rotor 20. The first side radial air channel 113 may communicate the air gap 40 with the electrical machine air outlet 112.

In some examples, the cooling system may comprise a heat exchanger. The heat exchanger may comprise a first fluid circuit and a second fluid circuit. The first fluid circuit may be connected to the cooling system to cool the electrical machine. The second fluid circuit may cool the fluid flowing along the first fluid circuit. The fluid of the second fluid circuit may be for example air or water. The first fluid circuit may comprise a heat exchanger air inlet connected to the electrical machine air outlet to receive a warm air flow from the air gap. In addition, the first fluid circuit may comprise a heat exchanger air outlet connected to the electrical machine air inlet to deliver an air flow to the air gap. A conduit may be arranged between the electrical machine air outlet and the heat exchanger air inlet to guide the air flow towards the heat exchanger. A conduit may connect the heat exchanger air outlet to the electrical machine air inlet.

Air flow from the air gap may be cooled down by the second fluid circuit and this cooled air flow may be inputted to the electrical machine through the electrical machine air inlet to cool down the electromagnetic components arranged on the air gap.

As mentioned before, the cold air flow may thus cool down the electromagnetic components of the rotor and of the stator arranged at the air gap 40. The air flow may axially pass through the air gap from the second side 102 to the first side 101 to cool down the electromagnetic components arranged at the air gap. Heat from the electromagnetic components is transferred to the air flow and the temperature of the air flow at the first side 101 may be higher than at the second side 102. Since the temperature of the (cooling) air flow may be higher at the first side 101, the cooling of the coils at this side of the electrical machine is done with warmer air. Cooling may thus be less effective locally.

Figure 4:
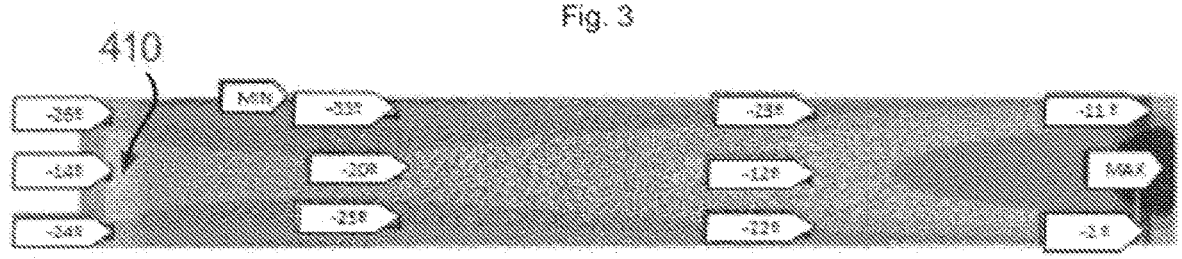
FIG. 4 schematically illustrates a temperature distribution along a length of a coil in an electrical machine.

An example of a resulting temperature distribution along an axial length of a coil may be seen in FIG. 4. At first side 101, the coil has a significantly higher temperature than on the second side 102, i.e. the side 410 where the cooling air flow approaches the air gap.

Such a local hot spot may be a limiting factor in a design of an electrical machine. One way to reduce a hot spot would be to provide colder cooling air, or a higher mass flow of cooling air. These measures however require an overall increase in pumping or blowing power.

Figure 5:
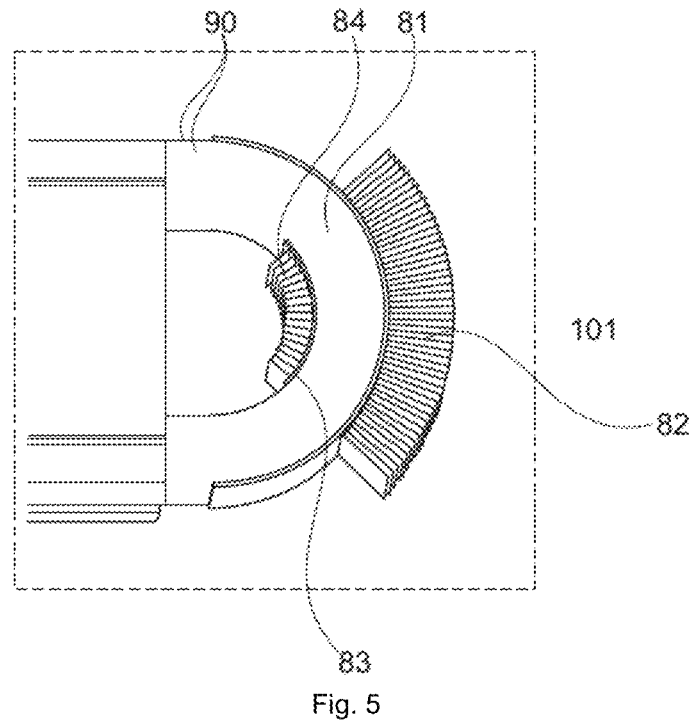
FIG. 5 schematically illustrates a coil of a stator of an electrical machine with a plurality of heat sinks, according to an example.
Figure 6:
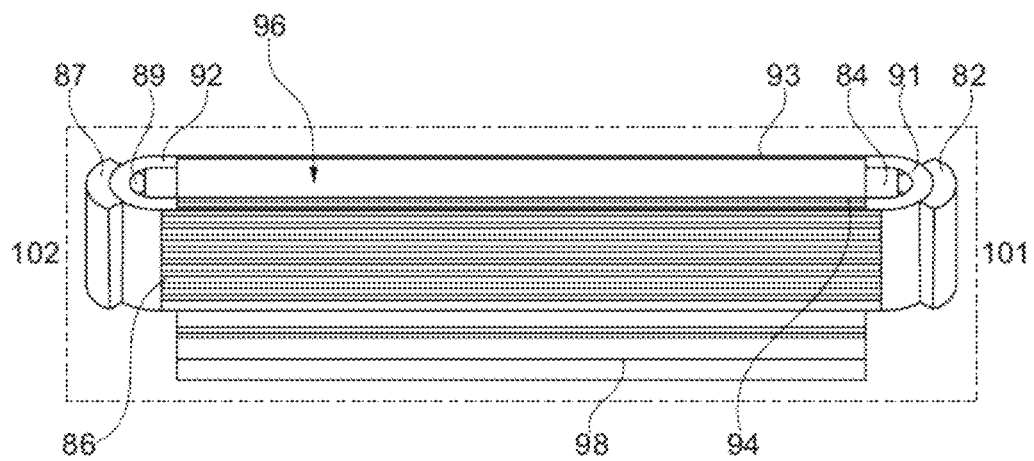
FIG. 6 schematically illustrates another example of an electrical coil with heat sinks.

With respect to FIGS. 5 and 6, some systems and methods for reducing a temperature in an electrical coil and for distributing heat along electrical coils differently, and in particular, more homogeneously. Even though the problem of inhomogeneous temperature distribution was shown in an electrical machine with a radial air gap, the following also applies in case of an axial air gap. And even though in FIG. 3, the rotor was shown to radially surround the stator, the same or similar systems and methods may also be applied in case the stator radially surrounds the rotor.

In an aspect, an electrical machine 10 comprising a rotor 20, a stator 30 and an air gap 40 arranged between the rotor 20 and the stator 30, wherein the stator 30 comprises a plurality of electrical coils 90. One or more of the electrical coils 90 carry a heat sink 82, 84, wherein the heat sink 82, 84 is attached to the electrical coil 90 with a thermally conductive material.

The electrical machine may be a permanent magnet generator. A rotor of the permanent magnet generator carries a plurality of magnets, which may be in the form of permanent magnet modules. The rotor may be arranged to radially surround the stator. A wind turbine may comprise the electrical machine, i.e. in this case the permanent magnet generator. The permanent magnet generator may be directly driven.

In some examples, as the example of FIG. 5, the heat sink 82, 84 may comprise a plurality of fins. A fin may herein be regarded as an externally projecting rib. The fins may have a constant or a varying spacing between each other. The design of the fins, and their spacing may be optimized to provide an optimized cooling air flow. The (cooling) air in the air gap can cool the fins.

A heat sink may be designed to maximize its surface area in contact with the air around it. Air velocity, choice of material, protrusion design and surface treatment are factors that affect the performance of a heat sink.

The fins may be attached to the electrical coil via a thermally conductive adhesive or resin, or a double-sided tape. As the fins cool down, the electrical coils can locally cool down. The resin or adhesive can be an electrically insulating material. Also the fins may be made of an electrically non-conductive material.

In some examples, a glue may an epoxy resin including metals, metal oxides, silica or ceramic microspheres. Epoxies with e.g. aluminum nitride or boron nitride fillers may be used. These materials can be highly thermally conductive and electrically insulating.

Electrical coils are generally made of a highly thermally conductive material such as copper, so if a temperature is locally reduced in a coil, this will affect the heat distribution throughout the remainder of the coil, through thermal conduction.

In some examples, the heat sink may be made of a substantially non-magnetic material. By using a non-magnetic-material, the electromagnetic field created between rotor and stator may be unaffected by the arrangement of the heat sink. A suitable material for the heat sink/fins may be aluminum.

In some examples, as illustrated e.g. in FIGS. 5 and 6, the electrical coils may be arranged around stator teeth 96, the coils 90 comprising a substantially obround shape having a first straight side 93 and a second straight side 94 parallel to the first straight side 93, and a first curved portion 91 connecting the first straight side 93 with the second straight side 94 at a first end 101, and a second curved portion 92 connecting the first straight side 93 with the second straight side 94 at a second end 102.

The stator tooth 96 forms a pole core around which the electrical coil is arranged and may include a pole shoe. The stator tooth 96 may be attached at a rim of the stator at base 98.

In the example of FIG. 6, the heat sinks 82, 84 are attached at the first curved portion 91. In this example, following the example of FIGS. 3 and 4, the second end 102 is closer to a cooling air supply than the first end 101.

In some examples, a heat sink 82 may be attached to an outside of the windings. In the example of FIG. 5, the coils define an outer diameter, and an inner diameter at either end of the coil 90. The heat sink 82 is attached along an outer diameter of the coil. In some examples, depending particularly on space available between a pole core (stator tooth 96) and coil 90, a heat sink 84 may be attached to an inside of the windings, i.e. along an inner diameter of the coils.

In some examples, like in FIGS. 5 and 6, heat sinks may be attached both at an inside of the windings and an outside of the windings.

In some examples, one or more of the electrical coils comprise a plurality of heat sinks. In some electrical machines, a cooling air flow may be assumed to be substantially homogeneously distributed along the circumference (i.e. along the radial air gap). In other electrical machines, the cooling air flow is not actually homogeneously distributed. The placement of heat sinks on only a selection of the coils, or varying size, and number of heat sinks between various coils can compensate for such an inhomogeneous cooling air distribution along the circumference.

As explained before, if the cooling air is supplied at the second end, higher temperatures may be expected at the first end. This does not mean that a heat sink is only suitable or useful at the second end.

In the example of FIG. 6, a first heat sink 82 is attached at an inner side of the first curved portion 91 at the first end 101, and a second heat sink 84 is attached at an outer side of the first curved portion 91. And a third heat sink may be attached at the second curved portion 92. A third heat sink 87 may be attached at an outer side of the electrical coil at the second end 102. A fourth heat sink 89 may be attached at an inner side of the electrical coil at the second end 102.

In some examples, like in FIG. 6, a heat sink 86 is attached at one of the first and second straight sides 93, 94, or at both the first and second straight sides. The heat sink in this example along the straight sides may be substantially straight fins. The arrangement of the heat sinks along the straight sides may be tailored in accordance with the specific needs in an electrical machine to generally lower the average temperature of the stator coil and/or to make the temperature distribution more homogeneous.

In the example of FIG. 6, heat sinks may extend along the complete height of the electrical coil. In other examples, heat sinks may extend only along a part of the height of the electrical coil.

In a further aspect, a method for modifying a temperature distribution of a stator 30 in an electrical machine is provided. The method comprises operating the electrical machine and measuring a temperature distribution of electrical coils 90 of the stator 30 when operating. The method further comprises attaching a heat sink 82, 84, 87, 89, 86 to a selected area of the surface of one or more electrical coils of the stator (or rotor in case the rotor has coils) to increase a contact surface with an air flow around the electrical coils.

The electrical machine may again be a generator or a motor. Even if simulations have been carried out prior to designing and operating an electrical machine, the real temperature distribution may be different than expected. If a temperature distribution is detected that can be problematic, e.g. the average temperature may be higher than expected, or local hot spots can occur, the provision of heat sinks can be a relatively easy way to resolve these issues. One of more heat sinks may be retrofitted in an existing electrical machine.

In an example, before fitting a heat sink a temperature difference between the lowest temperature and the highest temperature of the electrical coil may be e.g. 30° C. or 40° C. or 50° C. or more. Heat sinks may be attached at selected areas, and particularly the hotter areas of the electrical coil. Selection of a suitable area of the coil may take into account the temperature distribution in operation and the space availability on and around the coils. In some examples, after fitting the heat sinks, the maximum temperature difference may be e.g. 20° C. or less.

Particularly in large electrical machines such as directly driven wind turbine generators, retrofitting local heat sinks may be beneficial as compared to alternative solutions such as increasing air flow mass.

In some examples, the temperature distribution of the stator coils when operating may be more homogeneous after attaching the heat sink(s). In further examples, the average overall temperature may be lowered after attaching the one or more heat sinks. In other examples, the average temperature may be lower and the overall heat distribution may be more homogeneous.

In some examples, operating the electrical machine may comprise providing a cooling air flow through an air gap arranged between a rotor and the stator. In some electrical machines, a dedicated air cooling system may have been provided. In other electrical machines, in which the herein disclosed devices and systems may be used, there is no dedicated air cooling system. Instead, cooling is generally provided by the movement of air through the air gap.

In a further aspect of the present disclosure, an electrical machine is provided comprising a stator having a plurality of electrical coils, a rotor, and an air gap radially arranged between the stator and the rotor. The electrical machine furthermore comprises a cooling system configured to provide a cooling air flow from a first side of the air gap to a second side of the air gap. Herein, one or more passive heat exchangers are attached to the electrical coils configured to modify the cooling air flow and/or to increase a contact surface with the air flow.

As explained hereinbefore, modifying the cooling air flow and increasing contact between a coil that is to be cooled and the cooling air flow can affect the average or temperature and a temperature distribution of the coil.

The passive heat exchangers may comprise a plurality of fins. In examples, these passive heat exchangers or "heat sinks" may include structure to generate turbulence or vortices to optimize contact between the (cooling) air flow and the heat sink.

In some examples, the electrical coils may be arranged around stator teeth, the coils comprising a substantially obround shape having a first straight side and a second straight side parallel to the first side, and a first curved portion connecting the first straight side with the second straight side at a first end, and a second curved portion connecting the first straight side with the second straight side at a second end. Fins may be attached at one or both of the first and second curved portions. Even though structures that increase contact area may also be attached along the straight sides, there is generally more space available at the curved ends of the coils.

Even though in the illustrated examples, passive heat exchangers of heat sinks were shown to be attached to a surface of coils on the stator, the same may be applied to coils on the rotor.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An electrical machine, comprising:
   a rotor and a stator;
   an air gap defined between the rotor and the stator; and
   one of the stator or the rotor comprising a plurality of electrical coils,
   wherein at least one electrical coil of the plurality of coils comprises a heat sink to dissipate heat to the air gap,
   wherein the heat sink is attached to the at least one electrical coil with a thermally conductive material,
   wherein a temperature distribution of the at least one electrical coil is more homogeneous with the heat sink attached than without the heat sink attached and a difference between a highest temperature and a lowest temperature of the at least one electrical coil is less than 20° C. with the heat sink attached.

2. The electrical machine according to claim 1, wherein the heat sink comprises a plurality of fins.

3. The electrical machine according to claim 1, wherein the heat sink is made of a substantially non-magnetic material.

4. The electrical machine according to claim 1, wherein the heat sink is attached to an outside of the at least one electrical coil.

5. The electrical machine according to claim 1, wherein the heat sink is attached to an inside of the at least one electrical coil.

6. The electrical machine according to claim 1, wherein the at least one electrical coil is arranged around teeth, the at least one electrical coil comprising a substantially obround shape having a first straight side and a second straight side parallel to the first straight side, and a first curved portion connecting the first straight side with the second straight side at a first end, and a second curved portion connecting the first straight side with the second straight side at a second end.

7. The electrical machine according to claim 6, wherein the heat sink is attached at the first curved portion.

8. The electrical machine according to claim 6, wherein the second end is closer to a cooling air supply than the first end.

9. The electrical machine according to claim 6, wherein the at least one electrical coil comprises a plurality of the heat sinks.

10. The electrical machine according to claim 9, wherein for the plurality of electrical coils comprises a plurality of the heat sinks, a first one of the heat sinks is attached at an inner side of the first curved portion, and a second heat sink is attached at an outer side of the first curved portion, and wherein a third one of the heat sinks is attached at the second curved portion.

11. The electrical machine according to claim 1, wherein the stator comprises the plurality of electrical coils.

12. A wind turbine comprising the electrical machine according to claim 1.

13. A method for modifying a temperature distribution of an electrical coil in an electrical machine, the method comprising:
    operating the electrical machine;
    measuring a temperature distribution of the electrical coil while operating the electrical machine; and
    attaching a heat sink to a selected area of a surface the electrical coil to increase a contact surface with an air flow around the electrical coil, wherein the temperature distribution of the electrical coil is more homogeneous after attaching the heat sink than before attaching the heat sink and a difference between a highest temperature and a lowest temperature of the electrical coil is less than 20° C. after attaching the heat sink.

14. The method according to claim 13, wherein operating the electrical machine comprises providing a cooling air flow through an air gap arranged between a rotor and the stator.

* * * * *